D. F. HERVEY.
HARD OIL OR HARD GREASE OILING DEVICE.
APPLICATION FILED FEB. 20, 1911.
998,899.
Patented July 25, 1911.
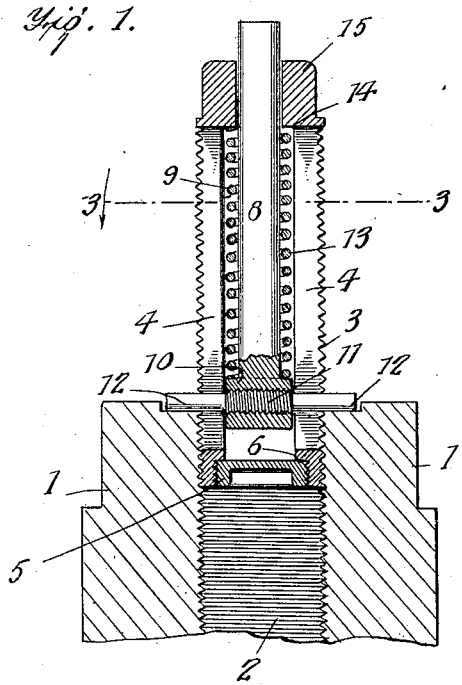
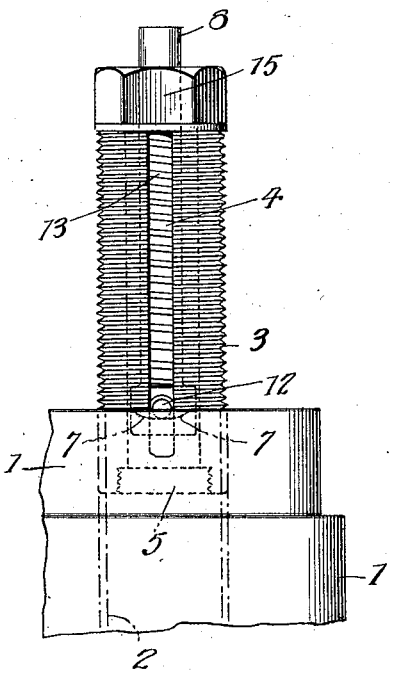
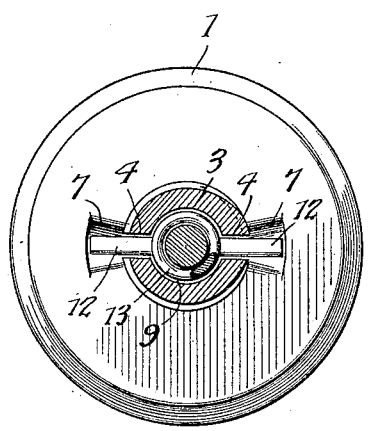
Witnesses
L. H. Schmidt
M. A. Bond
Inventor
DAVID F. HERVEY,
By E. K. Bond
Attorney
COLUMBIA PLANOGRAPH CO., WASHINGTON, D. C.

UNITED STATES PATENT OFFICE.

DAVID F. HERVEY, OF LOGANSPORT, INDIANA.

HARD-OIL OR HARD-GREASE OILING DEVICE.

998,899. Specification of Letters Patent. Patented July 25, 1911.

Application filed February 20, 1911. Serial No. 609,692.

*To all whom it may concern:*

Be it known that I, DAVID F. HERVEY, citizen of the United States, residing at Logansport, in the county of Cass and State of Indiana, have invented certain new and useful Improvements in Hard-Oil or Hard-Grease Oiling Devices, of which the following is a specification.

This invention relates to certain new and useful improvements in hard oil or hard grease plug oiling devices in which plugs are used for forcing the hard grease downwardly onto the crank pin or part to be lubricated.

The present invention has for its objects among others to produce a simplified and improved, yet durable and efficient device of this character composed of few parts, those readily assembled and separated when desired.

It has a further object to provide a simple and efficient form of locking device.

Still another object is to provide such a hard grease plug and locking device as will not only lock the plug and prevent its turning and thereby losing out but will also provide means for the passage of air through the same, so as to cool the plug somewhat and prevent undue expansion as is liable to result in case the driving rod becomes unduly heated.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a substantially central vertical section. Fig. 2 is a side elevation. Fig. 3 is a cross section on the line 3—3 of Fig. 1 looking in the direction of the arrows.

Like numerals of reference indicate like parts throughout the different views.

Referring to the drawings, 1 designates the driving rod having screw-threaded axial opening 2.

3 is a plug screw-threaded exteriorly, the threads thereof engaging the threads of the opening 2, as seen clearly in Fig. 1. This plug is provided with the longitudinal slots 4 upon diametrically opposite sides. The lower end of the plug 3 is open, being closed by a screw-threaded plug 5 designed to answer the purpose of a socket nut, the same engaging a shoulder 6 on the lower end of the plug 3, as seen in Fig. 1, to limit its inward movement. This serves to close the lower end of the plug 3 and prevent grease from entering into the same.

The upper face of the rod 1 is provided with oppositely disposed depressions 7 which are inclined in opposite directions toward their center, as seen clearly in Figs. 2 and 3.

8 is a stem loosely received within the bore 9 of the plug 3 having at its lower end a transverse enlargement 10, in which is retained in any suitable manner, as for instance by screw threading, as seen at 11, the transverse rod 12, which extends from opposite sides through the slots 4 and adapted to normally rest within the lower portions of the recesses 7 in the outer end of the driving rod 1.

13 is a spring surrounding the stem 8 within the bore 9, its lower end bearing against the transverse enlargement 10 and its upper end against the annular shoulder 14 on the cap nut 15 having a polygonal outer contour, as seen in Fig. 2, adapted to receive a wrench when necessary.

With the parts constructed and arranged substantially as hereinbefore described, the operation is as follows: Supposing the driving rod to be filled with hard grease and the parts in position as shown in Fig. 1, and the lower end of the plug 3 engaged with the threads of the opening 2 in the driving rod, when it be at any time desired to force the hard grease downwardly, the plug 3 is turned by applying force to the nut 15. As the plug is turned, the rods or pins 12 riding up the inclines of the depressions 7 slightly compress the spring 13 and as the plug is further turned the rods 12 ride on the smooth face of the end of the driving rod until they are again brought opposite the grooves or depressions 7 when the spring forces them downward and holds them in such position as to lock the plug against turning. This operation is repeated whenever it is desired to force the plug 3 inward to force the grease to the bearing. When it is desired to replenish the device, the plug is screwed out until it is removed, the grease put in position and the plug then replaced when the same operation takes place.

Modifications in details may be resorted to without departing from the spirit of the invention or sacrificing any of its advantages.

What is claimed as new is:—

1. In a device of the character described, a driving rod having a threaded bore and formed on its outer face with depressions with oppositely sloping sides, a screw threaded plug forming a plunger and engaged within the bore of the rod and having oppositely disposed slots, a stem received within said plug and having a lateral portion at its inner end, lateral rods held in said lateral portion and projecting through the slots, means for turning the plug, and a spring within the plug bearing against the lateral portion of the stem.

2. In a device of the character described, a driving rod having a threaded bore and formed on its outer face with depressions with oppositely sloping sides, a screw threaded plug forming a plunger and engaged within the bore of the rod and having oppositely disposed slots, a stem received within said plug and having a lateral portion at its inner end, lateral rods held in said lateral portion and projecting through the slots, means for turning the plug, a spring within the plug bearing against the lateral portion of the stem, and a removable plug closing the inner end of the first-named plug.

3. In a device of the character stated, a driving rod having a threaded bore, a plunger with removable end, exteriorly threaded to engage the threads of the driving rod and longitudinally slotted, a stem movable within the plunger, means removably engaged in and projecting laterally from the stem through the slots of the plunger, a cap nut on the plunger through which the stem passes and a spring within the plunger around the stem bearing against said nut and means on the lower end of the stem, the outer face of the driving rod being provided with oppositely disposed depressions inclined in opposite directions toward their centers.

DAVID F. HERVEY.

Witnesses:
 BYRON B. GORDON,
 A. E. BULL.

Copies of this patent may be obtained for five cents each, by addressing the "Commissioner of Patents, Washington, D. C."